March 29, 1960     R. A. DEIBEL     2,930,066

WINDSHIELD CLEANING SYSTEM

Filed Dec. 8, 1955     2 Sheets-Sheet 1

INVENTOR.
Raymond A. Deibel
BY
Beau, Brooke, Buckley & Beau,
ATTORNEYS.

March 29, 1960     R. A. DEIBEL     2,930,066
WINDSHIELD CLEANING SYSTEM

Filed Dec. 8, 1955     2 Sheets-Sheet 2

INVENTOR.
Raymond A. Deibel
BY
Beau, Brooks, Buckley & Beau,
ATTORNEYS.

United States Patent Office 2,930,066
Patented Mar. 29, 1960

2,930,066

WINDSHIELD CLEANING SYSTEM

Raymond A. Deibel, Cheektowaga, N.Y., assignor to Trico Products Corporation, Buffalo, N.Y.

Application December 8, 1955, Serial No. 551,928

4 Claims. (Cl. 15—250.02)

This invention relates generally to the window cleaning art, and more particularly to a new and useful vehicle windshield cleaning system embodying means automatically coordinating an electrically operated windshield wiper with a windshield washer, whereby the former is automatically actuated upon selective actuation of the latter.

Windshield washer systems of the type which are adapted to apply washing fluid to a vehicle windshield in the path of the wipers, thereby enabling selective cleaning of that portion of the windshield which lies within the wiping path, have been widely adopted in recent years. Generally, however, the vehicle operator must first actuate the washer system, and then independently actuate the wiper system. Subsequently the vehicle operator must shut off at least the wiper system. These multiple operations are not only inconvenient, but in addition they provide a significant distraction and consequently a potential hazard to safe driving.

Various arrangements have been proposed for coordinating the wiping and washing systems whereby upon actuating a single control both the washer and the wiper will be turned on and subsequently automatically turned off, according to a predetermined pattern. Primarily such prior art arrangements have been directed to vacuum operated window wiping systems utilizing a fluid motor operated by a pressure differential. However, electric wiper motors have become quite popular in recent years, and while washer-wiper coordinating arrangements have been proposed for use with an electric wiper motor it is felt that in many instances such prior art arrangements possess certain disadvantages such as being relatively complicated or expensive and requiring a relatively large number of moving parts of a type which are apt to get out of order.

Accordingly, it is a primary object of this invention to provide a practical coordinated vehicle window washing and wiping system wherein an electric wiper motor is actuated automatically in response to actuation of a washing system, and wherein the electric wiper motor is turned off automatically at the conclusion of the washing operation, whereby actuation of but a single control is all that is required in order to provide a complete washing and wiping action.

It is also an object of this invention to provide a vehicle window cleaning system as aforesaid wherein the coordinator mechanism is selectively controllable to provide the desired pattern of operation of the electric wiper with respect to the operation of the washer.

Another object of this invention is to provide a coordinated vehicle window washing and wiping system as aforesaid which is relatively simple and extremely rugged in construction, requiring a minimum number of moving parts, and which provides a positive acting electric motor control means to ensure positive starting and stopping thereof.

A vehicle window cleaning system in accord with this invention is characterized by the provision, in combination with an electric wiper motor and a washer system for delivering washing fluid, of coordinating means actuating the wiper motor automatically upon actuation of the washer system, the coordinating means including means controlling energization of the wiper motor.

Other objects and advantages of a coordinated vehicle window cleaning system in accord with this invention will become clearly apparent from the ensuing detailed description thereof, taken together with the accompanying drawing wherein like reference numerals denote like parts throughout the various views and wherein.

Figure 1:
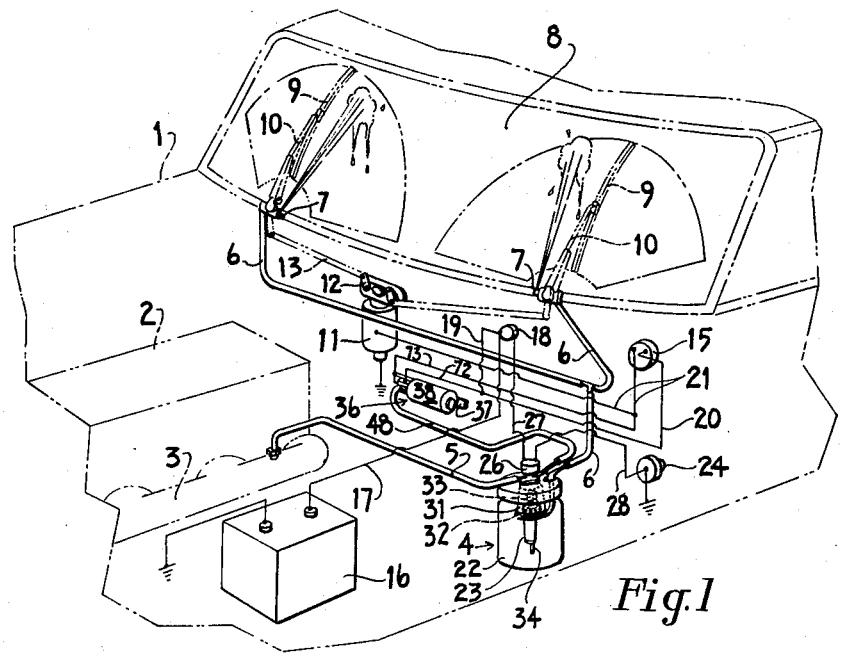
Fig. 1 is a diagrammatic view of one embodiment of a window cleaning system in accord with this invention installed in place on a vehicle.

Referring now to Figs. 1 through 5 of the accompanying drawings, there is shown a window cleaning system according to this invention installed in a vehicle 1 having the usual engine block 2 and intake manifold 3 providing a source of vacuum for the window cleaning system. The washer unit, generally designated 4, communicates with the intake manifold 3 through a suction conduit 5 and is arranged to deliver washing fluid through a delivery conduit 6 to a pair of discharge nozzles 7 arranged to direct the washing fluid onto the vehicle windshield 8 in the region of the wiper blades 9. Blades 9 are carried by the usual actuating arms 10, and are oscillated across the surface of the windshield 8 by an electric motor 11 having driving connection with the actuating arms 10 through the usual crank arms 12 and connecting linkage 13 in a manner known to the art.

The wipers 9 can be selectively actuated by means of a control switch 15 which is adapted to close an energizing circuit between motor 11 and the vehicle storage battery 16, the circuit comprising a lead 17 between battery 16 and the usual ignition switch 18, a lead 19 between switch 18 and a lead 20 which latter is connected to the control switch 15, and a lead 21 extending between switch 15 and motor 11. Both motor 11 and battery 16 are grounded to complete the circuit. Therefore, upon actuating switch 15 to interconnect leads 20 and 21, the wiper motor 11 will be energized to drive wipers 9 across the surface of windshield 8.

Washer 4 has a reservoir 22 for washing fluid mounted, for example, on the vehicle firewall, a pump unit 23 being positioned therein. Upon actuating a control switch 24, which preferably is positioned for convenient foot actuation, an energizing circuit is completed to a solenoid 26 associated with the washer from battery 16 through lead 17, switch 18, lead 27, solenoid 26, lead 28, switch 24 and through ground back to battery 16. Upon so energizing solenoid 26, the pump unit 23 is placed in communication with the intake manifold 3 through conduit 5, creating a vacuum in the upper chamber 31 of pump unit 23. This causes a plunger 32 to be retracted against a spring 33, sucking a charge of washing fluid into the pump from the reservoir 22 through a conduit 34. When the plunger 32 reaches the upper limit of its travel it trips a valve, not shown, which closes off conduit 5 and opens the chamber 31 to the atmosphere whereupon plunger 32 moves downwardly under the urging of spring 33 discharging the charge of washing fluid under pressure through conduit 6 to nozzles 7 which direct the fluid onto the surface of the windshield 8.

The above-described washer system is not per se a part of the instant invention, being more fully disclosed and claimed in copending application Ser. No. 323,902, filed December 3, 1952 by John R. Oishei, now Patent No. 2,746,652.

In accord with the instant invention the wiper system and the washer system are coordinated in a manner such that the wiper system is automatically actuated, to cause the wipers 9 to be oscillated across the surface of windshield 8, upon actuation of the washer system to cause washing fluid to be directed onto the windshield, and this is accomplished by means of a coordinator unit generally designated 36, secured for example to the vehicle firewall as by a bracket 37. Coordinator unit 36 preferably comprises, referring now to Figs. 1 and 5, a cylinder 38 detachably carried by bracket 37 and having mounted therein a piston member 39 slidable between limits on a piston rod or shaft 40. Shaft 40 is movable within cylinder 38, being guided by a boss 41 extending inwardly from an end wall of the cylinder. A spiral spring member 42 surrounds boss 41 and extends between the adjacent end wall 43 of cylinder 38 and piston 39 to urge the latter against a shoulder 44 carried by shaft 40 and defining one limit of piston movement thereon. Spring 42, bearing against piston 39, also forces shoulder 44 against a boss 46 formed on the opposite end wall 47 of cylinder 38.

A conduit 48 interconnects cylinder 38 and the upper chamber 31 of the pump unit 23, whereby upon actuating the washer solenoid to create a vacuum in the chamber 31 for retracting the piston 32, a vacuum is also created in the coordinator unit chamber 38 between end wall 43 and piston 39. This vacuum causes the piston 39 to be retracted against spring 42, the piston first moving along shaft 40 until it engages a second shoulder 49 thereon, following which piston 39 moves shaft 40 in a direction closing an electric switch generally designated 50. Atmospheric pressure is maintained on the opposite side of piston 39 by the admission of air into cylinder 38 through a filter screen 51 and a check valve 52.

Upon restoring atmospheric pressure to chamber 31 of pump unit 23, the spring chamber of cylinder 38 is similarly opened to the atmosphere thereby destroying the fluid pressure differential on piston 39. Piston 39 is then urged in the opposite direction under the influence of spring 42, and the rate of movement of piston 39 in this direction is regulated by the bleed valve 53 in the end wall 47 of the cylinder 38, check valve 52 having closed automatically. Following a predetermined relative movement of piston 39 from shoulder 49 to shoulder 44, piston 39 moves shaft 40 in a direction opening the electric switch 50.

Switch 50 is a snap acting electric switch, adapted to positively make and break contact, and comprises a body 54 of insulating material positioned on an insulated base 55 carried by a bracket 55' extending from end wall 43. A first terminal 56 carrying a contact 56' extends through a wall of the body 54 and is positioned thereon as by nuts and a lock washer, and a second terminal 57 is carried by a pivot plate 58 positioned between body 54 and base 55. At its outer end, shaft 40 is formed with a portion 60 of reduced diameter between the opposite ends of which there is positioned a slide block 61, the slide block 61 thereby having a limited lost motion connection with the shaft 40.

Pivot plate 58 has a bifurcated inner end construction providing upstanding legs 62 between which slide block 61 is adapted to slide, and legs 62 have their upwardly facing inner ends formed to provide knife edges serving as a fulcrum for pivoting of a contact member 63 thereon.

Contact member 63 is cut out to provide spaced apart leg portions 64 joined at one end thereof by a relatively broad base portion 66 carrying a contact 67 adapted to engage contact 56'. Leg portions 64 are recessed, as at 68, to provide bearing surfaces receiving the knife edges of the legs 62, and then curve upwardly and over to their other end where they are joined by a relatively narrow cross bar portion 69.

Figure 2:
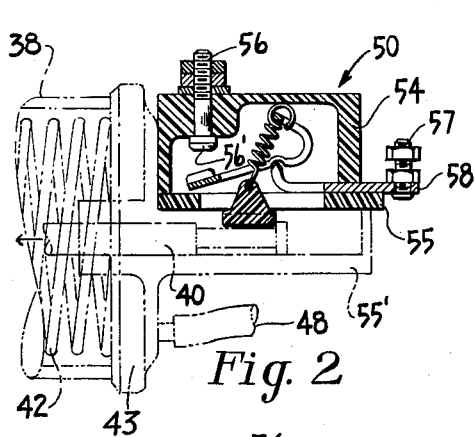
Fig. 2 is a fragmentary detail view of the coordinator mechanism in one position of operation.
Figure 3:
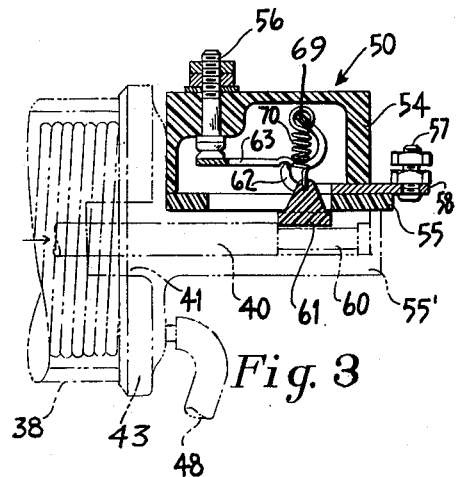
Fig. 3 is a fragmentary detail view corresponding to Fig. 2 but showing the coordinator mechanism in a second position of operation.
Figure 4:
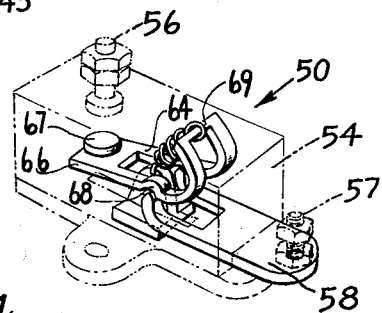
Fig. 4 is a perspective view of the electric switch shown in Figs. 2 and 3.
Figure 5:
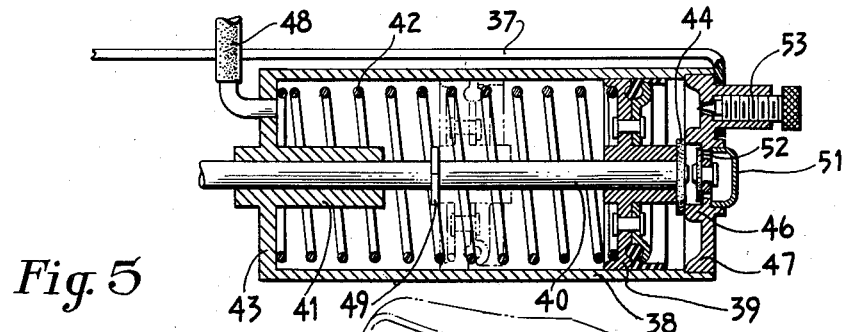
Fig. 5 is a longitudinal sectional view through the coordinator unit.

With both plate 58 and contact member 63 in a substantially level position, as shown in Fig. 3, the bar 69 and slide block 61 are positioned to one side of the contact member fulcrum point, and a spring 70 extends between slide block 61 and bar 69 thereby urging the bar 69 downwardly and causing the contact 67 to firmly engage against contact 56'. However, upon movement of slide block 61 to the opposite side of the legs 62, spring 70 will then be positioned on the opposite side of the contact member fulcrum point and causes contact member 63 to snap to a position disengaging contacts 67 and 56', as shown in Figs. 2 and 4.

A lead 72 connects terminal 56 to lead 19, and a lead 73 connects terminal 57 to lead 21, whereby switch 50 is adapted to close an energizing circuit for motor 11 comprising battery 16, lead 17, switch 18, lead 19, lead 72, terminal 56, contacts 56' and 67, contact member 63, plate 58, terminal 57, lead 73 and lead 21.

In operation, wiper motor 11 can be independently actuated at will by operating switch 15 to connect leads 20 and 21 and thereby complete the aforesaid motor energizing circuit.

Upon actuating the washer system by operating switch 24 to complete the energizing circuit for solenoid 26, the pump unit 23 takes in a charge of washing fluid and at the same time a fluid pressure differential is placed across the coordinator piston 39 causing the same to move against the urging of spring 42 first along shaft 40 and then, upon engaging shoulder 49, with shaft 40. Shaft 40 then engages slide block 61 and moves the same past the dead center position of spring 70 with regard to the fulcrum of contact member 63, and as slide block 61 and spring 70 move past this dead center position the contact member 63 is snapped to a closed contact position engaging contacts 56' and 67 to complete the aforesaid energizing circuit for motor 11.

As previously noted, the washer pump unit does not discharge washing fluid until plunger 32 is fully retracted. The lost motion connection between piston 39 and shaft 40, and between slide block 61 and shaft 40, together with the bias of spring 42, delay energization of wiper motor 11 until just before the washer pump unit commences delivery of the charge of washing fluid, whereby the wipers 9 are actuated just prior to delivery of the washing fluid to the windshield surface, or simultaneously therewith, thereby ensuring clear vision through the window at all times.

When the pump unit 23 is charged and ready to commence the delivery of washing fluid to nozzles 7, the pressure differential thereacross and against piston 39 is automatically relieved thereby causing the piston to move under the influence of spring 42, its rate of movement being controlled by the bleed valve 53 so that, together with the delay caused by the lost motion between piston 39 and shaft 40, and between shaft 40 and block 61, the wipers remain in operation throughout the period during which washing fluid is being applied to the windshield and for a predetermined interval therebeyond, thereby ensuring a thoroughly wiped windshield surface. As the piston 39 moves to its normal position, shaft 40 engages slide block 61 to move it and the spring 70 past dead center position and thereby snap the contact member to its circuit opening position.

Therefore, it will be seen that the coordinating mechanism of this invention utilizes relatively few moving parts which are simple to fabricate and assemble and all of which are extremely rugged and durable in construction, thereby ensuring proper operation over a long period of time. In addition, the snap acting switch 50 ensures positive making and breaking of the electric motor energizing circuit even though the switch actuating parts move relatively slowly. This avoids arcing such as might be caused by weak or indefinite contact engagement and which is destructive of the contacts. With the instant invention, the switch makes and breaks contact with a positive action.

Figure 6:
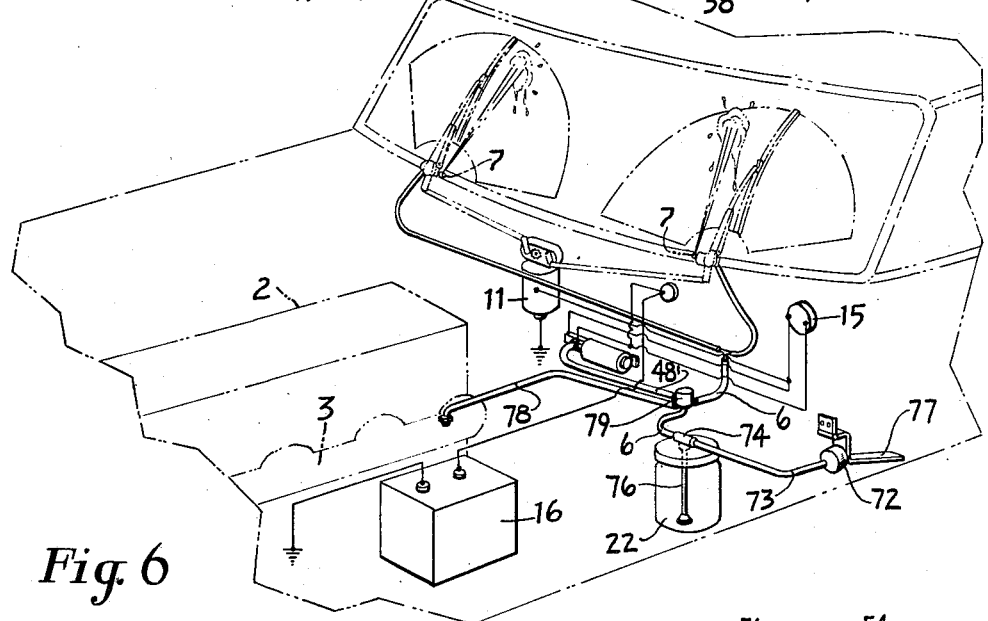
Fig. 6 is a view similar to Fig. 1 but showing a system according to this invention utilizing a modified form of washer mechanism.

It will be appreciated that a coordinator in accord with this invention is readily adapted for use with washer and wiper systems other than that illustrated in Fig. 1. For example, Fig. 6 shows an arrangement using the coordinator of Figs. 1 through 5 with a foot pressure actuated pump and with a hydrostatic valve controlling the coordinator.

In this arrangement, the washing fluid pump is in the form of a flexible bellows 72 communicating with the fluid reservoir 22 through a conduit 73 and a check valve 74 allowing washing fluid to be drawn from reservoir 22 through a conduit 76 and into conduit 73, but preventing reverse flow of the washing fluid. When it is desired to actuate the washer, the vehicle operator depresses a pivoted pedal 77 preferably mounted for foot actuation, which pedal collapses bellows 72 forcing the washing fluid therein through conduit 73 and conduit 6 to nozzles 7. Upon releasing the pedal 77, which can be spring urged away from bellows collapsing position, the bellows 72, which is of a resilient material, takes in a charge of fluid from reservoir 22 to be ready for the next windshield washing operation. This type of washer unit is disclosed and claimed in pending application Ser. No. 315,175 filed on October 16, 1952 by George O. Bartoo, now Patent No. 2,717,556.

The coordinator chamber 38 is adapted to communicate with the source of suction 3 through the conduit 48' valve 79 and conduit 78. Valve 79 can be of a known type actuated in response to hydrostatic pressure caused by the delivery of washing fluid to place the two conduits 48' and 78 in communication to place a pressure differential across the coordinator piston 39 and can, for example, correspond to the value shown in pending application Ser. No. 383,156, filed September 30, 1953 by John R. Oishei, now abandoned.

Figure 7:
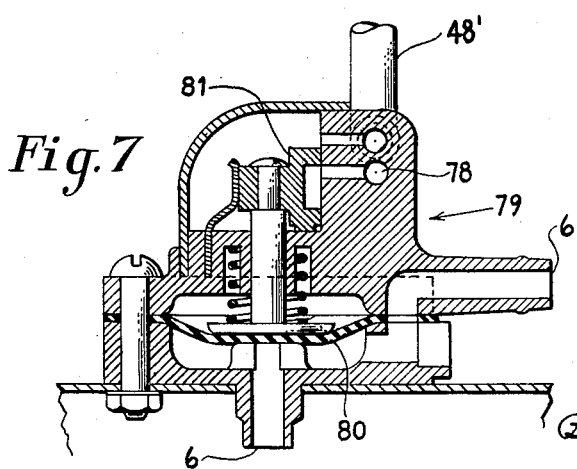
Fig. 7 is a sectional view of a hydrostatic valve usable in the system of Fig. 6.

As illustrated diagrammatically in Fig. 7, the hydrostatic valve 79 can include a flexible diaphragm 80 operatively connected to a slide valve 81 normally closing off conduit 48' from conduit 78 but placing them in communication in response to the hydrostatic pressure of washing fluid passing through the conduit 6.

Therefore, upon depressing pedal 77 a charge of washing fluid is delivered through conduits 73 and 6 to the nozzles 7, and simultaneously therewith the coordinator unit 36 closes the energizing circuit for motor 11 in the manner previously described.

Figure 8:
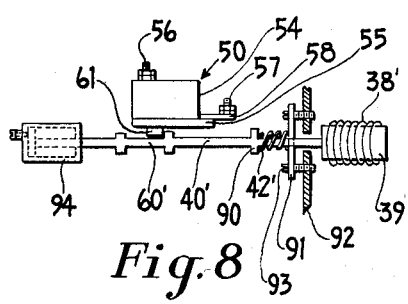
Fig. 8 is a schematic illustration of another form of the invention.

In addition, it is contemplated that the snap-acting coordinator switch means 50 could be actuated by electrically operated means, such as for example by replacing the coordinator cylinder 38 and piston 39 with the electric solenoid coil and armature arrangement shown schematically in Fig. 8.

Here the snap-acting switch 50, with its terminals 56 and 57, its insulated body 54 and base 55, and its plate 58 and slide block 61, remains the same as previously described, and can be connected to the motor energizing circuit in the same manner. A shaft 40', generally similar to the shaft 40, has a portion 60' of reduced diameter engaging slide block 61 with a lost motion connection, and can have a portion 39' comprising the armature of a solenoid coil 38'.

Solenoid 38' can be energized from battery 16 under the control, for example, of either switch 24 or a switch, not illustrated, actuated by depressing pedal 77. Or, if desired, the valve 79 of Fig. 7 could close an energizing circuit to coil 38', or coil 38' could be connected to the energizing circuit of solenoid 26 for energization therewith.

Solenoid 38' is adapted, upon actuating the washer system, to retract armature 39' and shaft 40' against the action of a spring 42' to move slide block 61 and close switch 50 to energize the wiper motor in the manner previously described. Part 60' provides a time delay through the lost motion connection with slide block 61, and spring 42', which extends between a shoulder 90 on shaft 40' and a plate 91 adjustably mounted on a support 92, can be adjusted by the adjusting screws 93 of such mounting to regulate the speed of movement of shaft 40'. The spring induced return stroke of shaft 40', opening switch 50, can be controlled by a dashpot arrangement 94 which also could control or help control the rate of movement on the switch closing stroke. Also, armature 39' could have a lost motion connection with shaft 40'.

Thus, this coordinator arrangement functions in generally the same manner as that previously described.

Accordingly, it is seen that the instant invention fully accomplishes the aforesaid objects, and provides a coordinated windshield cleaning system having means automatically energizing an electric wiper motor upon actuation of the washer unit, and automatically shutting off the motor following the washer operation, thereby ensuring a thorough windshield cleaning action upon actuating but a single control, the coordinator being of an extremely simple and durable construction providing positive control of the motor circuit.

It will be appreciated that the disclosed embodiment of the instant invention is susceptible of various modifications and variations within the purview of one skilled in the art, and accordingly it is intended that the scope of this invention be defined by the appended claims.

Having fully disclosed and completely described this invention, and its mode of operation, what is claimed as new is:

1. In a vehicle window cleaning system, a wiping element, means including an electric wiper motor for moving said wiping element across the surface of a vehicle window, energizing circuit means for said wiper motor, first switch means arranged in said energizing circuit means for selectively actuating said wiper motor, washer means including pump means adapted to deliver washing fluid to the window surface, control means for selectively actuating said washer means, and coordinator means actuating said wiper motor automatically in response to actuation of said washer means, said coordinator means including snap-acting second switch means arranged in said energizing circuit means in parallel with said first switch means and actuating means for said second switch means, said actuating means being responsive to operation of said washer means and operable through a lost motion connection to provide a predetermined time delay in the actuation of said second switch means.

2. In a vehicle window cleaning system, an electric motor adapted to oscillate a wiping element across the surface of a window, energizing circuit means for said motor, a washer unit having means for delivering washing fluid to the window surface, control means for selectively actuating said washer unit, and coordinator means actuating said motor automatically in response to actuation of said washer unit, said coordinator means including snap-acting switch means operatively associated with said energizing circuit means in controlling relation thereto, actuating means having a lost motion connection with said switch means, and means for selectively varying the rate of movement of said actuating means through said lost motion connection to open said switch means.

3. In a vehicle window cleaning system, means including an electric wiper motor adapted to oscillate a wiping element across the surface of a window, energizing circuit means for said motor, first control means for selectively actuating said wiper motor, washer means adapted to deliver washing fluid to a window surface, second control means for selectively actuating said washer means, and coordinator means actuating said wiper motor automatically in response to actuation of said washer means, said coordinator means including snap-acting switch means operatively associated with said motor energizing circuit means through a lost motion connection, and electrically operated actuating means for said switch means.

4. In a vehicle window cleaning system, means including an electric wiper motor adapted to oscillate a wiping element across the surface of a window, energizing circuit means for said motor, first control means for selectively actuating said wiper motor, washer means adapted to deliver washing fluid to a window surface, second control means for selectively actuating said washer means, and coordinator means actuating said wiper motor automatically in response to actuation of said washer means, said coordinator means including snap-acting switch means operatively associated with said motor energizing circuit means through a lost motion connection, and electrically operated third control means for said coordinator means.

References Cited in the file of this patent

UNITED STATES PATENTS

| | | |
|---|---|---|
| 1,850,785 | Bentley | Mar. 22, 1932 |
| 2,126,412 | Rowe | Aug. 9, 1938 |
| 2,743,473 | Oishei | May 1, 1956 |

FOREIGN PATENTS

| | | |
|---|---|---|
| 164,321 | Australia | July 25, 1955 |
| 1,082,258 | France | June 16, 1954 |